Figure 3:
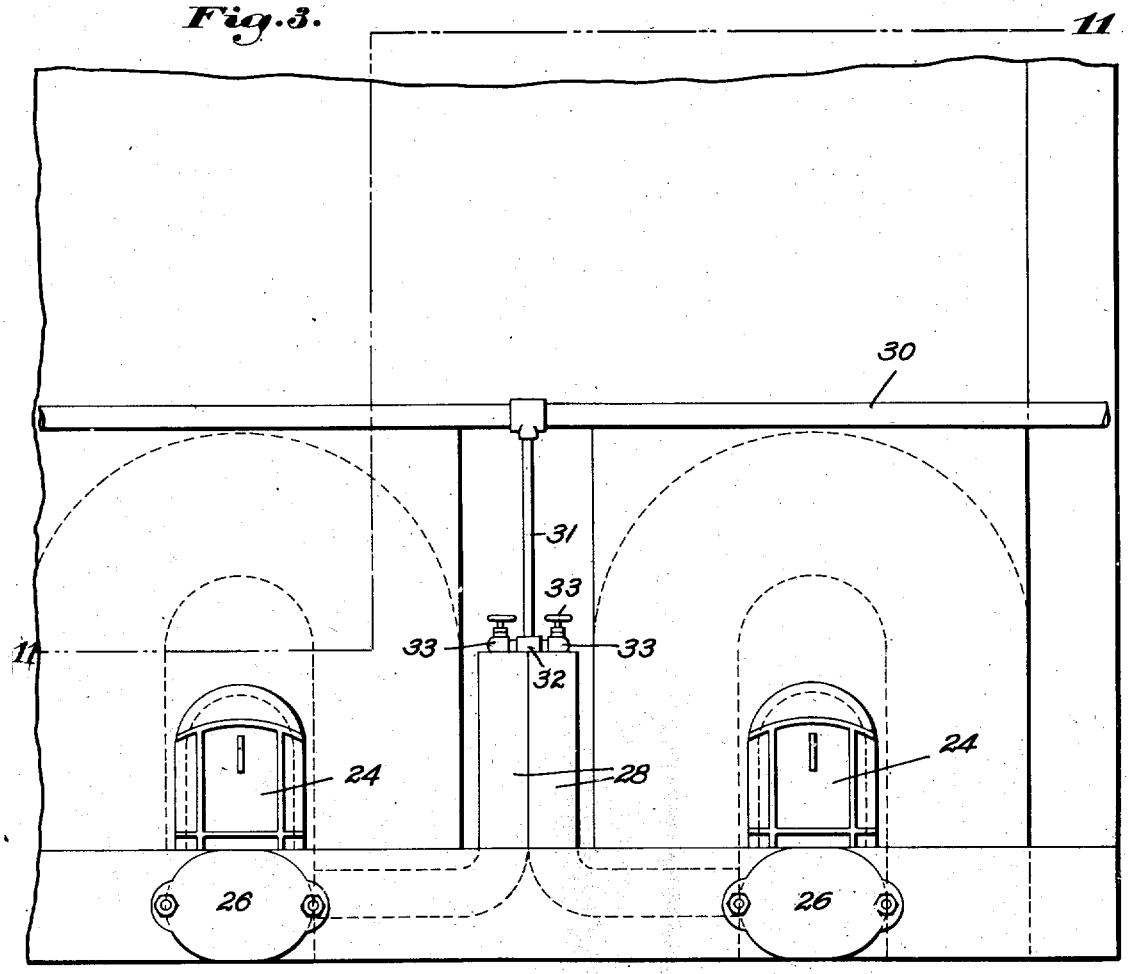

H. O. ROBINSON & C. STEADMAN.
KILN, FURNACE, &c.
APPLICATION FILED APR. 1, 1911.
Reissued July 14, 1914.
13,774.
4 SHEETS—SHEET 1.
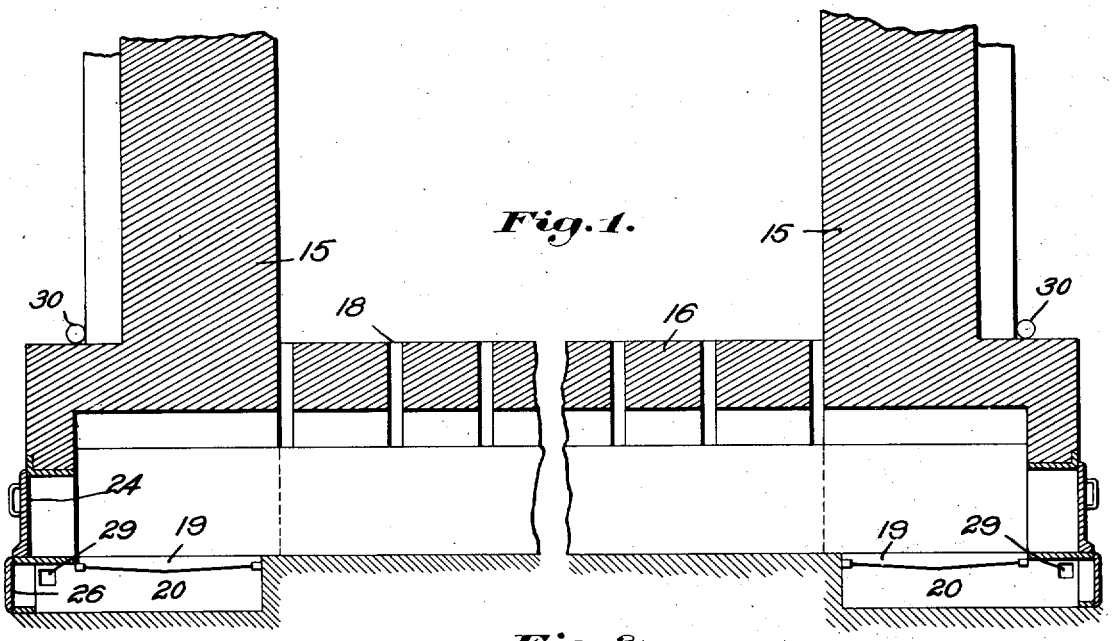
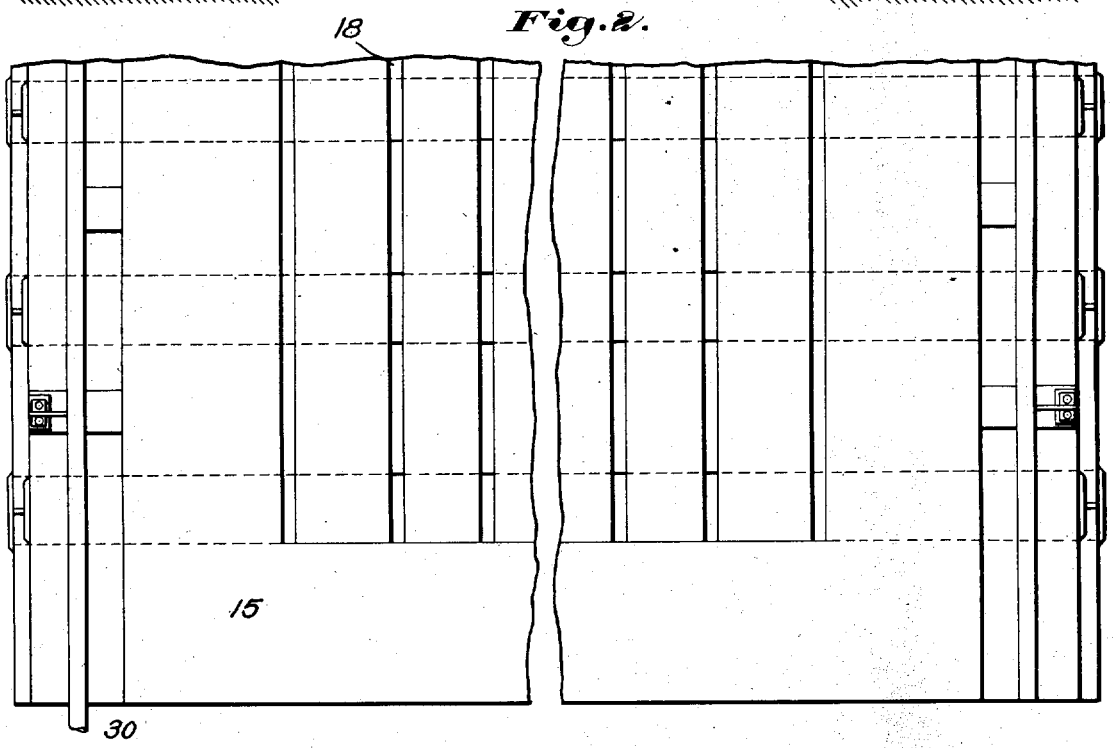
Witnesses:
Ernest A. Telfer
Earl L. Choate
Inventors:
Henry O. Robinson
Christopher Steadman
by Emery Booth Janney and Varney
their Att'ys.

H. O. ROBINSON & C. STEADMAN.

KILN, FURNACE, &c.

APPLICATION FILED APR. 1, 1911.

Reissued July 14, 1914. 13,774.

4 SHEETS—SHEET 2.

Witnesses:

Ernest A. Telfer

Carl L. Choate

Inventors:

Henry O. Robinson

Christopher Steadman by Emery Booth Janney and Varney their Att'ys.

H. O. ROBINSON & C. STEADMAN.

KILN, FURNACE, &c.

APPLICATION FILED APR. 1, 1911

Reissued July 14, 1914.

13,774.

4 SHEETS—SHEET 3.

Witnesses:

Ernest A. Tilfer

Carl L. Choate.

Inventors:

Henry O. Robinson

Christopher Steadman by Emery Booth Janney and Varney their Att'ys.

H. O. ROBINSON & C. STEADMAN.

KILN, FURNACE, &c.

APPLICATION FILED APR. 1, 1911.

Reissued July 14, 1914.

13,774.

4 SHEETS—SHEET 4.

Witnesses:

Ernest A. Telfer

Carl L. Choate.

Inventors:

Henry O. Robinson

Christopher Steadman by Emery Booth Janney and Varney their Att'ys.

UNITED STATES PATENT OFFICE.

HENRY O. ROBINSON, OF BROOKLINE, MASSACHUSETTS, AND CHRISTOPHER STEADMAN, OF HUGUENOT PARK, NEW YORK.

KILN, FURNACE, &c.

13,774. Specification of Reissued Letters Patent. Reissued July 14, 1914.

Original No. 971,642, dated October 4, 1910, Serial No. 512,338. Application for reissue filed April 1, 1911. Serial No. 618,488.

*To all whom it may concern:*

Be it known that we, HENRY O. ROBINSON, a citizen of the United States, and a resident of Brookline, county of Norfolk, and State of Massachusetts, and CHRISTOPHER STEADMAN, a subject of the King of Great Britain, residing at Huguenot Park, county of Richmond, State of New York, have invented an Improvement in Kilns, Furnaces, &c., of which the following is a specification.

This invention relates to kilns or furnaces for burning bricks, tiles, other clay goods, and ceramics, and for the drying or calcining of various materials, and the invention has particular reference to forced draft kilns.

The object of the present invention is to provide a kiln or furnace for burning brick and other materials requiring calcination in which the rate and nature of the combustion may be clearly and easily regulated whereby a uniform and superior quality of product is secured.

Another object of the invention is to provide a kiln or furnace the operation of which will result in economy of labor by expediting the process of burning and to secure economy of fuel by providing means whereby different kinds of coal, anthracite, or bituminous, or coke, or coke breeze, or refuse containing sufficient combustible carbon may be used in the furnaces to generate the necessary heat.

A particular object of the invention is to provide a kiln having a tight ash pit under the grates, and a steam jet draft forcer whereby fuels which are low in cost and which could not be used with a natural draft because of the slow combustion, may be utilized.

A further object of the invention is to provide means whereby, while maintaining the heat of the kiln at the desired high and critical point a sufficient amount of oxygen may be introduced to the clay goods to raise their component parts to the higher oxids whereby uniform and pleasing colors are developed in the burnt materials.

To these ends the invention consists in the construction and combination of parts substantially as hereinafter described and claimed.

Figure 4:
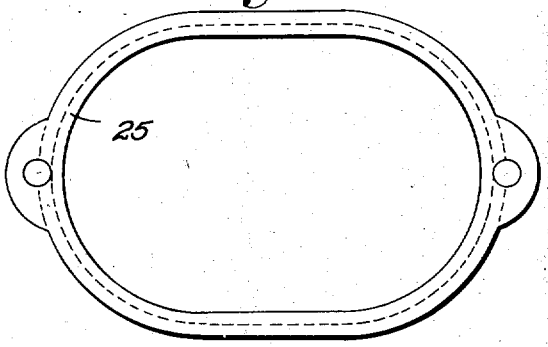
Figure 5:
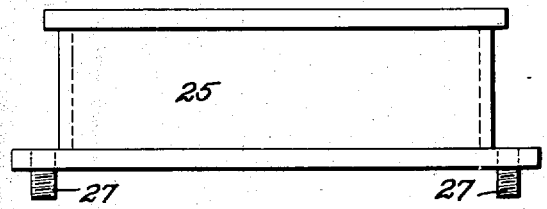
Figure 6:
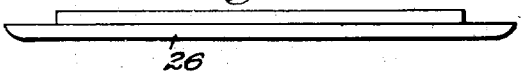
Figure 7:
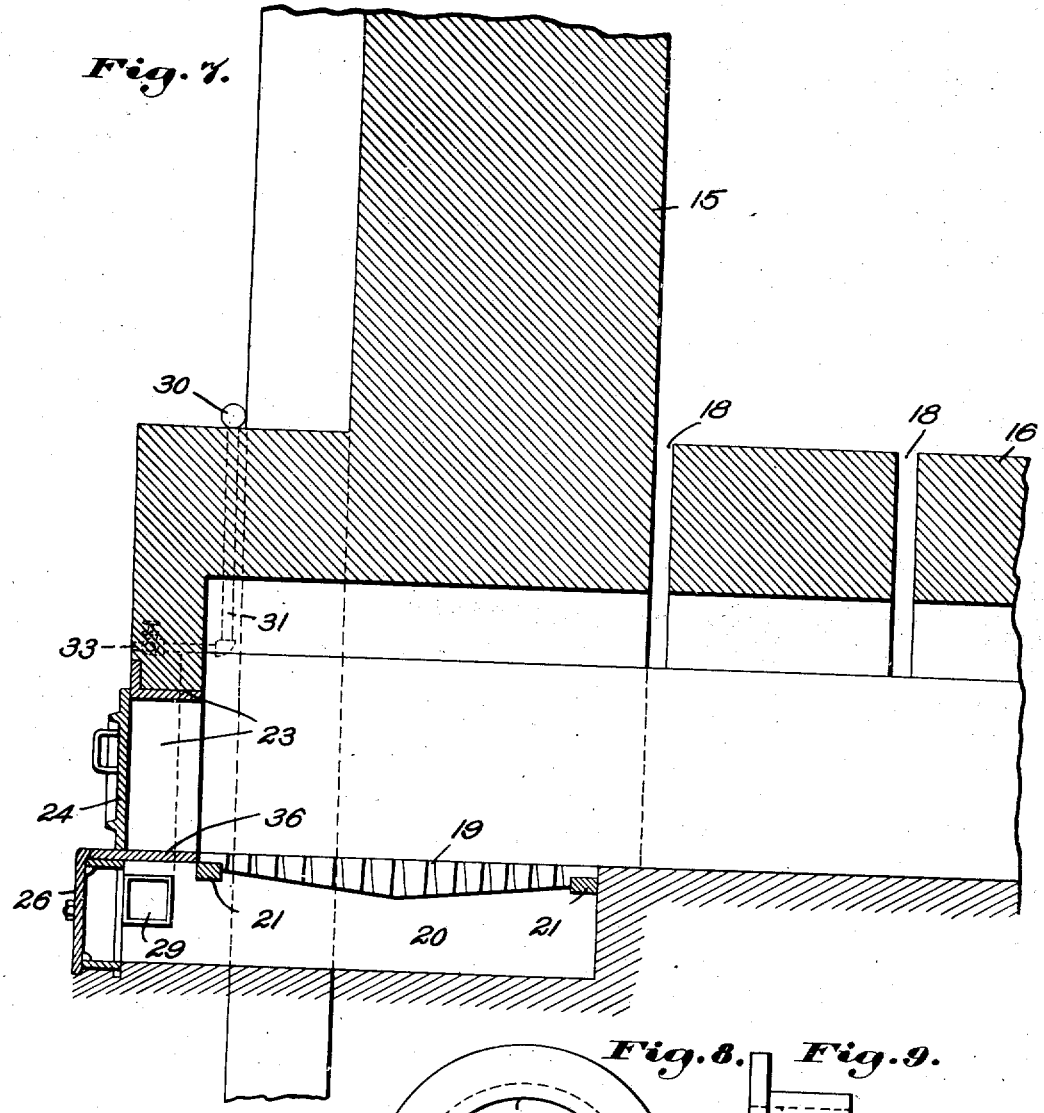
Figure 8:
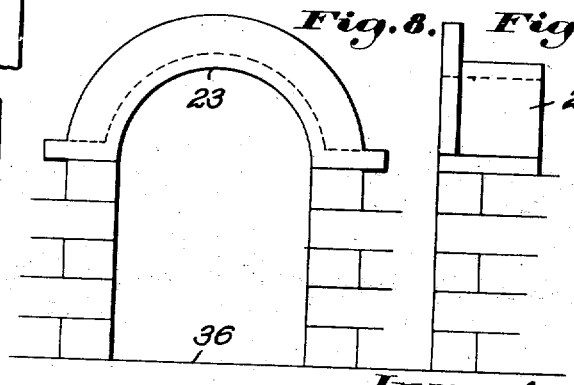
Figure 9:
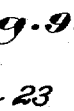
Figure 10:
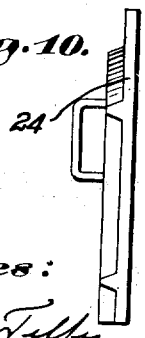
Figure 11:
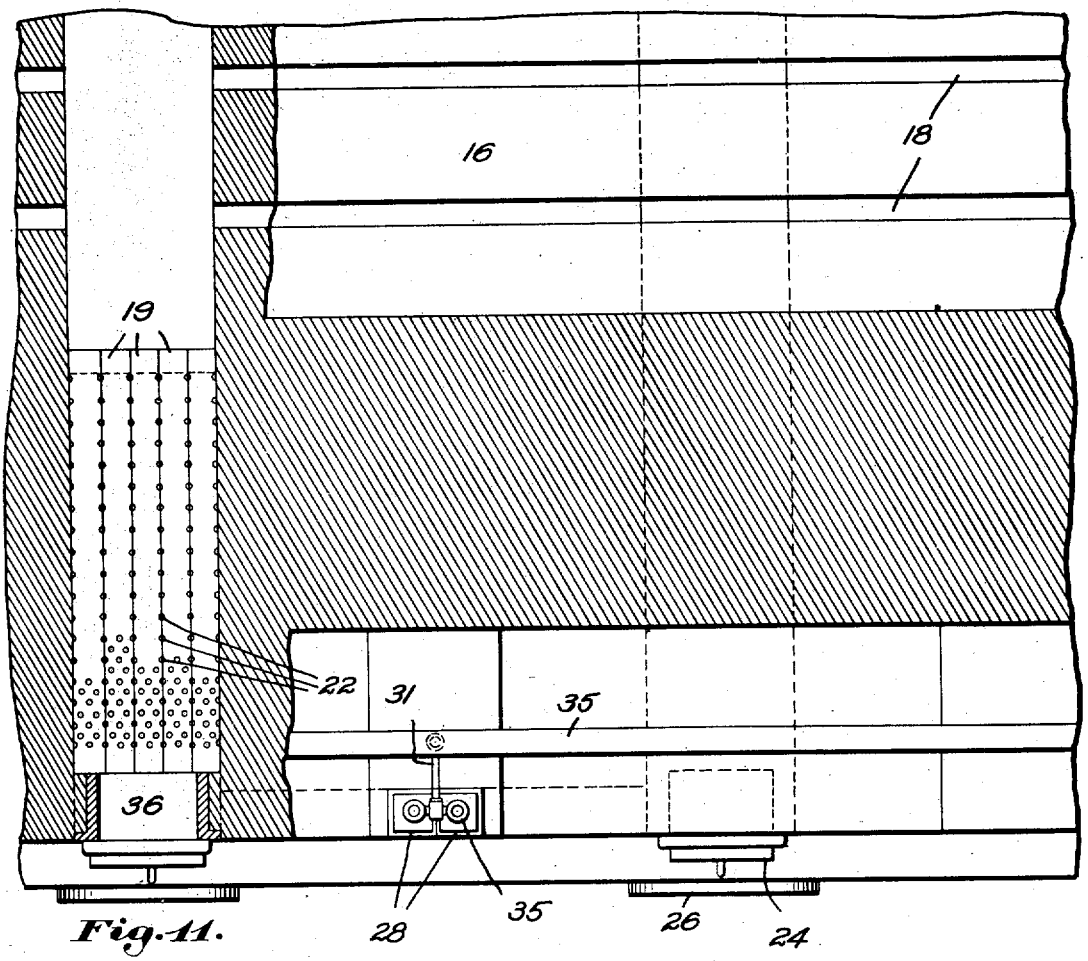
Figure 12:
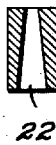
Figure 13:
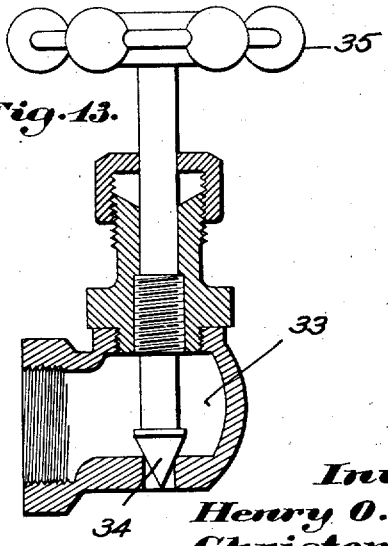

Of the accompanying drawings: Figure 1 represents a longitudinal sectional view of a kiln embodying our invention, the middle portion being broken out to reduce the length of the figure. Fig. 2 is a plan view of the same. Fig. 3 is a detail elevation from the left of Fig. 1, on a larger scale. Figs. 4, 5 and 6 are detail views of the frame and cover for the ash pit entrance. Fig. 7 is a view similar to the left hand portion of Fig. 1, but on a larger scale. Figs. 8, 9 and 10 are detail views of the furnace door and frame. Fig. 11 is a section on line 11—11 of Fig. 3. Fig. 12 is a detail sectional view of one of the grate bars. Fig. 13 is a detail sectional view of the needle valve for controlling the steam for the forced draft.

Similar reference characters indicate the same or similar parts in all of the views.

The walls of the kiln are indicated at 15 and floor at 16. The floor 16 is formed of a series of arches which are formed with narrow openings or slits 18, said slits permitting the heat from the fuel which passes along the arches from the grates to escape up into the body of the kiln.

At each end of each arch is a grate 19 beneath which is an ash pit 20 which is air tight as will be hereinafter described. The grates are preferably constructed as shown in Figs. 11 and 12 and comprise a series of bars which are suitably mounted on cross pieces 21, (see Fig. 7). Each bar has a large number of apertures 22 which are tapered as shown in Fig. 12, the smallest end of the apertures being at the top so that the ashes and waste from the fire may readily escape into the ash pit without clogging the passage. These apertures are quite small so as to enable fuel in a very fine state to be utilized. Preferably the edges of the bars have vertical grooves so that the abutting sides of any two grate bars will have their grooves registering so as to constitute a practically uniform arrangement of draft apertures. We propose to employ these grate bars in sections about 4 feet long by 3 inches wide, the apertures having $\frac{1}{4}$ inch diameter at the top and about $\frac{1}{2}$ inch diameter at the bottom so that the ashes will fall clear. The proportions described will permit of a total space per grate bar for the passage of air of about 8 square inches.

At front of each set of grate bars, there is a dead wall 36 and above said dead wall there is a door frame 23 for the door 24.

We have not attempted to show any particular fastenings for the doors 24 as they may be either sliding or hinged doors according to the preference of the builder, this portion of the structure not forming a part of our present invention, it being however essential of course that while the door 24 may be readily opened for supplying fuel for the grate, it will tightly close the opening when shut, its lower edge bearing squarely on the dead wall 36.

At the front end of the ash pit 20 is a frame 25 which is preferably somewhat oval shaped as shown in Fig. 4. Said frame is set in the masonry and has a flange at its front edge from which project screws 27, said screws passing through holes formed in the ash pit door 26, suitable nuts being employed to clamp the ash pit door firmly to the flange of the frame 25. This provides a very tight closure for the ash pit, said closure never being opened excepting when the run of the kiln has been finished and the fire is to be cleaned out. Of course the ash pit door may be opened however if necessary.

Referring to Fig. 3, it will be seen that the vertical air trunks 28 are arranged in pairs which trunks are open at their upper ends as shown in Fig. 11, the lower ends of said trunks diverging as shown by dotted lines in Fig. 3 and leading to two ash pits, the point of discharge into an ash pit being indicated at 29 in Fig. 7. The said trunks, extending as they do to points remote from the fire-boxes, prevent ashes and coal from being drawn into their free open ends during firing, etc.; and also are sufficient in extent to serve as mixing chambers for the steam and air which are thus introduced into the furnace as a homogeneous gas.

A header pipe 30 from any suitable boiler or other source of steam supply runs along each end of the kiln as shown by comparing Figs. 1 and 3. Each header pipe communicates by a pipe 31 with a branch 32, each branch leading to a needle valve casing 33 which may be of any preferred type.

In Fig. 13 we show an ordinary form of steam needle valve, the valve proper being indicated at 34 and the handle at 35. The discharge from the needle valve is directly downward into an air trunk 28 so as to induce a current of air into the open upper end of the trunk and force it into the tightly closed ash pit.

Having described the general structure of the kiln we will now describe the operation thereof: After the kiln has been filled with green brick and prepared for burning in the usual way, the valves 34 are slightly opened, causing jets of steam to enter the trunks and entrain air into the air tight ash pits from which the air can only escape through the fine apertures of the grates. A fire is started on the grates, with wood or charcoal or by means of some coal which has been previously kindled on another grate, and as the draft through the grates causes the fire to burn freely and as it blazes up, the fire is covered with fresh coal to such extent as desired. For the first twenty-four hours, a light thin fire is maintained whereby the bricks in the lower part of the kiln are dried and warmed for the later stages of the burning. Then the heat in the furnace of the kiln is gradually raised by opening the steam valve more (increasing the draft) and by firing at more frequent intervals. This higher degree of heat is raised to such an extent and maintained for a period of time as is desired to make the brick or other clay goods of the desired hardness. In our case ninety-six hours from the starting of the fires is frequently sufficient to complete the burn in a brick kiln set fifty-five high. At all times during the burning, the fires in our furnaces are under most convenient control, a slight turn of the steam valve being all that is necessary to raise or lower the draft and temperature in any arch. It is the usual practice of burning with most clays to at times admit air to the arches by opening the doors on the same, and this we are able to do at will; but preferably admit the air by thinning the fuel bed, when so desired, to such an extent that a portion of the air blows through it unconsumed but heated to such an extent that it does not check or crack the goods, as by opening the doors, and we are able in this way to secure a better quality of goods.

We claim as our invention:

1. A kiln containing, in combination, a furnace, means to supply a forced-draft thereto, said means having a steam-inlet opening into which air may be drawn by the steam and sufficient in extent to permit the air and steam to form therein a homogeneous mixture, means to inject steam into said opening, and means to distribute said draft through the fuel body, the said furnace, except for the opening aforesaid, being tight so that the kiln cannot normally draw any gases from the furnace except the hot gases of combustion.

2. The combination, in a kiln, of a furnace, a draft conduit having an inlet-end and multiple delivery to deliver air within a mass of fuel supported at said multiple delivery, and a steam-jet device arranged to deliver into said inlet-end, said conduit being sufficient in extent to permit the steam and air to be thoroughly mixed therein and also being air tight, except for the inlet and multiple delivery, to prevent any steam or air from passing into the kiln save through the fuel bed.

3. A kiln containing in combination a furnace, means to provide a forced-draft therefor, a steam supply device for said forced-draft means and sufficiently removed from the point of combustion to insure for said draft a homogeneous mixture of steam and air, means to regulate said steam supply and thereby the resultant draft, and means to distribute said resultant homogeneous draft through the fuel-body.

4. The combination, in a kiln, of a furnace, a draft-intake therefor extending from the fuel-bed to a point outside the furnace and having its outer end of substantially uniform cross-section, and means terminating in a jet-forming valve to deliver a draft-regulating fluid-jet to said outer end of the draft intake and thereby induce in said intake a controllable entrained draft for said furnace.

5. The combination, in a kiln, of a furnace, a draft-intake therefor extending from a multiple delivery end at the fuel-bed to an open receiving end located above the furnace door, a steam delivery pipe, and a jet-forming and controlling valve in which said pipe terminates located at the open end of the draft-intake, said pipe and valve being thereby adapted to deliver into said intake a varying amount of steam without destroying the jet.

6. A kiln containing, in combination, a furnace; an air trunk having an intake for conveying forced-draft to said furnace and a multiple delivery end provided with a plurality of relatively small openings for delivering said forced-draft to said furnace; means to induce said draft in said air trunk and through said multiple delivery into said furnace to regulate said draft; said intake being sufficiently removed from said multiple delivery to secure uniformity in both the composition of the regulated draft and its delivery to the furnace through said openings.

7. In a brick-kiln formed with separate and substantially independent arches providing individual fire spaces extending at intervals transversely across the kiln and having means to open and close at will the ends of the arches along the sides of the kiln, the combination of means for delivering steam to each arch and means to control the delivery of said steam to each arch independently of the delivery of the steam to every other arch, whereby by opening and closing the ends of the arches and at the same time varying the amount of steam admitted thereto, the burning of each part of the kiln is under control independently of the other parts.

8. A kiln having a floor formed of a series of arches, a grate beneath each end of each arch, a dead wall located in front of each grate and approximately in line therewith, a fuel door for each grate having its lower end resting squarely upon said dead wall, whereby an air tight closure is formed, an ash-pit for each grate also provided with an air tight closure, an air-trunk located in each front wall of the kiln and having outlets in the ash-pits below the dead walls, and means for variably forcing air through said air trunks.

9. A kiln having a floor formed of a series of arches, a grate beneath each end of each arch, a dead wall located in front of each grate and approximately in line therewith, a fuel door for each grate having its lower end resting squarely upon said dead wall, whereby an air tight closure is formed, an ash-pit for each grate also provided with an air tight closure, air trunks arranged in pairs and located in each front wall of the kiln between each pair of arches, said air trunks diverging at their lower ends and each discharging in an ash-pit below the grate, and means for variably forcing air through said trunks.

This specification signed and witnessed this 1st day of March, A. D., 1911.

HENRY O. ROBINSON.
CHRISTOPHER STEADMAN.

Signed in the presence of—
JOHN W. THOMPSON,
LUCIUS L. VARNEY.